US012300913B2

(12) United States Patent
Moser

(10) Patent No.: US 12,300,913 B2
(45) Date of Patent: May 13, 2025

(54) TERMINAL WITH RELEASE LEVER

(71) Applicant: ELECTRO TERMINAL GMBH & CO KG, Innsbruck (AT)

(72) Inventor: Peter Moser, Innsbruck (AT)

(73) Assignee: ELECTRO TERMINAL GMBH & CO KG, Innsbruck (AT)

(*) Notice: Subject to any disclaimer, the term of this patent is extended or adjusted under 35 U.S.C. 154(b) by 356 days.

(21) Appl. No.: 17/864,769

(22) Filed: Jul. 14, 2022

(65) Prior Publication Data

US 2023/0027033 A1 Jan. 26, 2023

(30) Foreign Application Priority Data

Jul. 21, 2021 (DE) ..................... 20 2021 103 878.0

(51) Int. Cl.
*H01R 11/09* (2006.01)
*H01R 4/48* (2006.01)

(52) U.S. Cl.
CPC ............. *H01R 11/09* (2013.01); *H01R 4/483* (2023.08); *H01R 4/4835* (2023.08); *H01R 4/4821* (2023.08); *H01R 4/485* (2023.08)

(58) Field of Classification Search
None
See application file for complete search history.

(56) References Cited

U.S. PATENT DOCUMENTS 9,124,034 B2 9/2015 Koellmann et al.
9,437,940 B1 9/2016 Rao et al.
11,043,759 B2 * 6/2021 Ober-Woerder ... H01R 4/48455
11,146,018 B2 * 10/2021 Koellmann ........ H01R 4/48365
11,688,956 B2 * 6/2023 Froebing ................ H01R 11/11 439/441

(Continued)

OTHER PUBLICATIONS

Extended European Search Report issued in connection with the corresponding European Patent Application No. 1 22179083.5 on Nov. 22, 2022.

*Primary Examiner* — Ross N Gushi
(74) *Attorney, Agent, or Firm* — The H.T. Than Law Group

(57) ABSTRACT

The present invention relates to a terminal (1) with a spring force terminal connection (2) with at least one conductor terminal point (K), an insulating material housing (6), a conductor introduction channel (60), and a release lever (5). The release lever (5) is mounted in the insulating material housing (6) pivotably about a pivot axis (A) extending transverse to a conductor introduction direction (E) of an electric conductor between an idle position with closed conductor terminal point (K) and an actuating position with opened conductor terminal point (K). The release lever (5) has two lever arm portions (50) which are spaced apart from one another and which are immersed on both sides of the conductor introduction channel (60) at least partially into the insulating material housing (6). The lever arm portions (50) have in each case a guide portion (53) which face one another and form between them at least a part of the conductor introduction channel (60). The guide portions (53) in the idle position and/or in the actuating position, as seen in the conductor introduction direction, run toward the conductor terminal point (K) in a manner which narrows the conductor introduction channel (60).

18 Claims, 8 Drawing Sheets

(56) References Cited

U.S. PATENT DOCUMENTS

| | | | |
|---|---|---|---|
| 2013/0157520 A1 | 6/2013 | Koellmann et al. |
| 2014/0370740 A1 | 12/2014 | Koellmann et al. |
| 2021/0075144 A1 | 3/2021 | Koellmann |

* cited by examiner

TERMINAL WITH RELEASE LEVER

FIELD OF THE INVENTION

The present invention relates to a terminal and in particular a screw or connecting terminal for electrical connection of at least one electrical conductor which has a release lever for optional opening of a conductor terminal point.

BACKGROUND OF THE INVENTION

A terminal with a release lever of the above-mentioned type is known from the prior art. For mounting, the release levers are mounted rotatably in an insulating material housing of the terminal. The insulating material house furthermore accommodates a spring force terminal connection which forms the conductor terminal point. The release lever can be pivoted from an idle position into an actuating position in order to thus interact with the spring force terminal connection for opening the conductor terminal point. The insulating material house generally has a conductor introduction channel which partially narrows toward the conductor terminal point in order to guide a conductor to be introduced reliably to the conductor terminal point. A certain length of the conductor introduction channel is required for this purpose.

SUMMARY OF THE INVENTION

One object of the present invention is thus to provide a terminal of the type described above which enables a compact design alongside reliable conductor introduction.

This object is achieved by the subject matter of the independent claim. The dependent claims further develop the central concept of the present invention in a particularly advantageous manner.

According to a first aspect, the present invention relates to a terminal, in particular screw or connecting terminal. The terminal has (at least) one spring force terminal connection with at least one conductor terminal point for electrical connection of at least one conductor. The terminal furthermore has an insulating material housing which at least partially accommodates the spring force terminal connection. The terminal furthermore has a conductor introduction channel which extends in a conductor introduction direction from the outside toward the conductor terminal point. The terminal furthermore has a release lever. The release lever is mounted in the insulating material housing pivotably about a pivot axis extending transverse (preferably orthogonal) to the conductor introduction direction between an idle position, in which the conductor terminal point for connection of an electrical conductor is closed, and an actuating position, in which the conductor terminal point is opened by interaction of the spring force terminal connection with an actuating portion of the release lever. The release lever has two lever arm portions which are spaced apart from one another and which are immersed on both sides of the conductor introduction channel at least partially into the insulating material housing. The lever arm portions have in each case a guide portion which face one another and form between them at least a part of the conductor introduction channel. The guide portions run in the idle position and/or in the actuating position as seen in conductor introduction direction toward the conductor terminal point in a manner which narrows the conductor introduction channel; they thus preferably run at least partially toward one another as seen in the conductor introduction direction toward the conductor terminal point in a manner which narrows the conductor introduction channel. The guide portions (which at least partially form the conductor introduction channel) thus enable guidance of an electrical conductor to be introduced into the terminal toward the conductor terminal point.

As a result of the provision of two lever arm portions which face one another, these can be immersed as deep as possible into the insulating material housing and thus lie on both sides of the conductor introduction channel. A generally flat terminal with a release lever can thus be provided. These lever arm portions then simultaneously form a part of the conductor introduction channel via their guide portions so that the terminal can be formed to be narrow overall. Since the lever arm portions narrow the conductor introduction channel via their guide portions toward the conductor terminal point, at least one (lateral) region, facing the conductor terminal point, of the conductor introduction channel otherwise located in the insulating material housing-under certain circumstances, even the entire (lateral region) of the conductor introduction channel—can be displaced into the release lever. The terminal can thus also be formed to be short in terms of its length as seen in the conductor introduction direction. Since furthermore at least the narrowing of the conductor introduction channel is now displaced into the release lever, a transition to the release lever otherwise only located in a narrowed region of the conductor introduction channel is widened, which in turn can reduce the risk of tilting of a conductor to be introduced. Fundamentally, the conductor introduction channel formed in this manner—and in particular the partially narrowing profile of the guide portions—can preferably have any desired profile or contour which enables a conductor introduction and thus defined guidance of an electrical conductor to be introduced toward the conductor terminal point. Profiles toward the conductor terminal point which are where possible of a flowing or wave-shaped nature and are preferably not step-shaped or do not change in an erratic manner in cross-section are preferred, but not in a manner which restricts the invention.

If the guide portions are provided with the stated narrowing in the idle position, the introduction of a rigid conductor can be correspondingly simplified and reliably enabled even in the case of a conductor terminal point not opened by the release lever. If the guide portions are provided with the stated narrowing in the actuating position, the introduction also of a flexible conductor can be correspondingly simplified and reliably enabled in the case of a conductor terminal point opened by the release lever. Depending on the application and what is desired, the guide portions with the stated narrowing can thus be present either only in the idle position or only in the actuating position or preferably both in the idle position and in the actuating position—and where necessary also in any pivot position therebetween.

The guide portions can run as seen in the conductor introduction direction toward the conductor terminal point in a manner which continuously narrows the conductor introduction channel or they run smoothly. In this manner, particularly simple and reliable guidance and sliding of the conductor along the guide portions toward the conductor terminal point can be enabled. A continuous profile enables targeted guidance toward the conductor terminal point. A flowing profile enables overall a profile which is optimally adapted to the conditions and the space requirement while maintaining the miniaturization and reliable guidance of the conductor to be introduced. For example, where necessary, the guide portions can also have portions which are partially parallel to the conductor introduction direction in addition to the partially narrowing portions as long as overall a narrowing toward the conductor terminal point is ensured and the narrowing is provided by flowing contours which obtains reliable and simple guidance/sliding of a conductor to be introduced.

The guide portions can have in each case a first and a second guide sub-portion which in each case face one another. The first guide sub-portion of one guide portion thus then faces the first guide sub-portion of the other guide portion. The second guide sub-portion of one guide portion then likewise faces the second guide sub-portion of the other guide portion. On one hand, in the idle position, the first guide sub-portions then run as seen in the conductor introduction direction toward the conductor terminal point in a manner which narrows, preferably continuously narrows the conductor introduction channel or smoothly narrows the conductor introduction channel. These then lie in the idle position of the release lever on both sides of the conductor introduction channel and laterally delimit it correspondingly oppositely. On the other hand, in the actuating position, the second guide sub-portions then run as seen in the conductor introduction direction toward the conductor terminal point in a manner which narrows, preferably continuously narrows the conductor introduction channel or smoothly narrows the conductor introduction channel. These then lie in the actuating position of the release lever on both sides of the conductor introduction channel and laterally delimit it correspondingly oppositely.

As a result of the provision of the two above-mentioned guide sub-portions, a particularly optimized embodiment for corresponding narrowing of the conductor introduction channel can be achieved both in the idle position and in the actuating position. This is in particular advantageous the further the pivot axis is spaced apart from the conductor introduction channel or its center as seen in the conductor introduction direction. The guide sub-portions can thus be formed oriented to the respective pivot positions of the release lever in order to always ensure optimal conductor guidance in each desired pivot position. In a case in which the pivot axis centrally crosses the conductor introduction channel, for example, the narrowest point can also be provided in the region of the pivot axis and widen this with increasing distance to the pivot axis (at least counter to the conductor introduction direction). In the case of simple geometry of the guide portions, particularly good conductor introduction can thus always be enabled over a large and preferably any possible pivoting range.

In principle, the guide portions or guide sub-portions can have any desired form or geometry in order to provide at least in the two stated release lever positions, preferably however also therebetween or even over the entire pivoting range of the release lever, a corresponding narrowing and thus to enable particularly simple and reliable conductor introduction. For example, the guide portions or their guide sub-portions can be in each case concavely arched and preferably concavely arched away from the conductor introduction channel. The guide portions or their guide sub-portions can also be formed to be in each case bowl-shaped (i.e. for example as a bowl-shaped recess or depression) in the respective lever arm portion. This enables, in addition to simple geometry, a particularly flowing profile and thus particularly reliable and simple conductor introduction.

The guide portions, preferably the guide sub-portions, can preferably be formed by a change in material thickness-preferably axial with respect to the pivot axis—of the respective lever arm portion. A simple structure of the guide portions can thus be provided. These can be provided with particular ease; for example, in an injection molding process.

The guide portions which face one another, preferably their guide sub-portions, can preferably be formed to be mirror-symmetrical to one another; thus preferably with respect to a plane of symmetry having the conductor introduction direction and lying centrally between the lever arm portions. Reliable and uniform introduction of an electrical conductor into the terminal and toward the conductor terminal point can thus be enabled.

The lever arm portions can have in each case partially circular sliding portions which extend around the pivot axis and are directed radially away from the pivot axis. These sliding portions then interact with corresponding housing sliding portions for sliding guidance of the release lever about the pivot axis. The bearing forces of the release lever can thus be easily distributed and received in the insulating material housing.

The sliding portions preferably have first sliding sub-portions which extend in relation to the pivot axis along a first circle with first diameter d; this preferably in the region of the respective guide portions. The sliding portions furthermore have second sliding sub-portions which extend in relation to the pivot axis along a second circle with second diameter D which is preferably larger than first diameter d; this preferably in the region outside the respective guide portions.

The lever arm portions can thus be formed to be optimized in accordance with their desired purpose. For example, the first sliding sub-portion can thus provide a desired length to narrow the conductor introduction channel; this, for example, defined by the circular surface of the first circle. The second sliding sub-portion can on the other hand have a desired distance (defined by the radius of the second circle) for secure mounting. Particularly preferably the second sliding sub-portions have the respective actuating portions or form these. In this regard an optimized length and thus a defined lever arm for opening the spring force terminal connection can be provided.

The lever arm portions can preferably extend in each case substantially in a plane of extent. These planes of extent are particularly preferably oriented parallel to one another and further preferably orthogonally to the pivot axis. The term "extend substantially in a plane of extent" should be understood such that the lever arm portions have a fundamental expansion in the plane of extent, while they are formed to be comparatively flat transversely thereto and can naturally vary in terms of their width in order e.g. to provide the guide portions, for example, as a surface contour or also other structural elements.

The release lever can preferably have latching structures which interact with corresponding housing latching structures of the insulating material housing in such a manner that the release lever is held in a detachably latching manner in the idle position and/or in the actuating position. The corresponding structures for the stated latching connection are configured here such that an operator can optionally bring the release lever into this latching connection and can release it from it again. The latching connection should furthermore be able to hold the release lever independently in precisely this position. In certain circumstances, the latching connection in the actuating position must therefore act counter to a spring force of the opened spring force terminal connection. An operator can thus easily introduce or remove a conductor. In the idle position, the release lever should remain securely "stored away" so that the maximum compactness of the terminal during operation is maintained and the risk of accident manipulation of the release lever is minimized.

The release lever, preferably the lever arm portions, can have first pivot bearing portions which interact with corresponding second pivot bearing portions of the insulating material housing for pivotable mounting of the release lever about the pivot axis. Reliable and simple pivot bearing can thus be provided alongside simple geometry of the release lever. First pivot bearing portions can particularly preferably be provided on or in a side of the lever arm portions facing away from the conductor introduction channel. The pivot bearing can thus be provided on one hand in a space-saving manner. On the other hand, this is then provided facing away from the guide portions so that, during introduction of a conductor, this pushes the lever arm portions upon contact for guidance in any event into the bearing connection so that the mounting can be reliably maintained in each actuating position. The pivot bearing portions can be formed, for example, as a projection (second pivot bearing portions; for example, in the form of a pin) and a recess which pivotably receives the projection (first pivot bearing portions; for example, in the form of a blind hole or a groove).

The release lever preferably has a lever actuating portion for movement of the release element about the pivot axis, preferably between the idle position and the actuating position. The lever actuating position can preferably extend substantially in a plane. The lever actuating portion can furthermore preferably extend between the lever arm portions and particularly preferably connect these to one another. In this manner, at an actuating engagement point of the release lever, said lever can be formed to be particularly stable. The lever actuating portion furthermore offers a comfortable manipulation point for an operator. Particularly preferably the actuating portion on one hand and the lever actuating portion on the other hand are provided at opposite ends of the release lever in order to thus provide particularly advantageous distribution of the functional portions about the pivot axis in order to obtain in particular an advantageous lever arm distribution.

The pivot axis can extend laterally outside the conductor introduction channel. The pivot axis preferably does not intersect the conductor introduction channel or an elongation of the conductor introduction channel as seen in the conductor introduction direction. On one hand space is thus created for the connecting portions and on the other hand the conductor introduction channel is still freely accessible. An overall stable release lever construction alongside a simultaneously compact design of the terminal can thus be achieved. In principle, however, the pivot axis can also run through the conductor introduction channel.

The insulating material housing can preferably have guide wall portions which, together with the guide portions, at least partially form or delimit the conductor introduction channel. A conductor introduction channel can thus be provided for overall reliable conductor introduction toward the conductor terminal point.

The conductor introduction channel preferably extends beyond the conductor terminal point in order to securely receive a distal conductor end in the case of an electrical conductor connected in the conductor terminal point.

The conductor introduction channel is preferably formed to be annularly closed as seen in the conductor introduction direction; this preferably over at least a part and preferably over its entire length from outside up to the conductor terminal point and possibly beyond the conductor terminal point. An electrical conductor can thus be securely received in the terminal and guided to the conductor terminal point.

The guide wall portions can furthermore have lateral wall portions which at least partially laterally delimit the conductor introduction channel in relation to the pivot axis axially on both sides. A lateral migration of a conductor to be introduced into the conductor introduction channel can thus be avoided particularly effectively.

The lateral wall portions preferably form a transition at least on the side of the conductor introduction channel and at least in the idle position or in the actuating position as seen in the conductor introduction direction running smoothly into the respective guide portion. These particularly preferably extend into one another over the surface. In this manner, a uniform conductor introduction channel can also be formed in the transition between insulating material housing and release lever. This in turn enables particularly reliable and easy introduction of an electrical conductor into the terminal.

The insulating material housing preferably has a cover wall which extends in the idle position of the release lever between a supporting portion of the release lever and the pivot axis above the conductor introduction channel. The terminal is then formed in such a manner that the supporting portion is supported during pivoting of the release lever about the pivot axis on the cover wall preferably in a smoothly running manner. On one hand, the spring force terminal connection can be covered toward the top. The release lever can thus furthermore be supported securely on the insulating material housing.

The insulating material housing can furthermore have separating wall portions which delimit the release lever, preferably at least the lever arm portions, in relation to the pivot axis axially on both sides at least partially laterally on the outside. In other words, the separating wall portions lie laterally next to the release lever as seen in the conductor introduction direction. In this manner, for example, the release lever can be reliably guided laterally during its pivoting movement. Since the guide portions form a narrowing of the conductor introduction channel, the release lever can thus be supported in a particularly simple and reliable manner with respect to the insulating material housing if an electrical conductor is introduced into the terminal and guided via the narrowing conductor introduction channel toward the conductor terminal point. The terminal can thus also have a particularly stable structure overall. The separating wall portions can furthermore contribute to a lengthening of the air and creep distance.

The separating wall portions particularly preferably have the second pivot bearing portions, as a result of which stable and secure mounting is provided.

The spring force terminal connection can furthermore have a busbar and a clamping spring with a movable clamping leg. The clamping leg can have a clamping portion, preferably in the form of a clamping edge, for the formation of the conductor terminal point between the clamping portion and the busbar. In this manner, a conductor terminal point can be provided which can be opened easily by means of the release lever.

The clamping spring, to be more precise, the clamping leg, at least in the closed position of the conductor terminal point, as seen in the conductor introduction direction, can extend transversely through the conductor introduction channel in order to form a lead-in chamfer toward the conductor terminal point. This enables particularly reliable conductor introduction directed up to the conductor terminal point.

The spring force terminal connection, preferably its clamping spring, can have a spring actuating portion which is arranged in such a manner that it interacts with the actuating portion for optional opening of the conductor terminal point. The provision of a defined spring actuating portion makes it possible to separate the corresponding functional regions of the spring force terminal connection for clamping on one hand and for actuating on the other hand and thus enable an effective configuration of the spring force terminal connection.

The spring force terminal connection can have several conductor terminal points and conductor introduction channels assigned to these which are preferably arranged at least partially in rows next to one another and/or above one another and/or directed toward one another. The conductor introduction directions of the conductor introduction channels assigned to the conductor terminal points are preferably oriented at least partially parallel to one another; preferably all. A terminal with as many conductor terminal points as desired can thus be provided. It is also conceivable that several spring force terminal connections are provided in a corresponding terminal or the spring force terminal connection is of multi-part or multi-component design. The spring force terminal connection can thus have, for example, a one-piece busbar with several clamping springs for the formation of the corresponding number of conductor terminal points. Several (in particular two) conductor introduction channels can also separate a clamping spring by virtue of the fact that, for example, its opposite leg forms in each case a clamping leg for one of two adjacent conductor introduction channels. The opposite legs then preferably push onto opposite clamping points of one busbar (or also several busbars) for the formation of in each case one conductor terminal point. The busbar can thus also be formed in several parts and form a corresponding number of conductor terminal points only with one or a part of the clamping springs.

In each case a release lever can preferably be assigned to at least one, preferably however two of the several conductor terminal points. Where necessary, the terminal can thus be equipped with release levers. The pivot axes of the release levers assigned to the several conductor terminal points can then preferably be arranged at least partially parallel or coaxially. This leads to an overall particularly compact design and simple operation of the terminal by an operator.

BRIEF DESCRIPTION OF THE DRAWINGS

Further configurations and advantages of the present invention will now be described on the basis of the figures of the accompanying drawings. In the drawings.

DETAILED DESCRIPTION OF THE PREFERRED EMBODIMENTS

Figure 1:
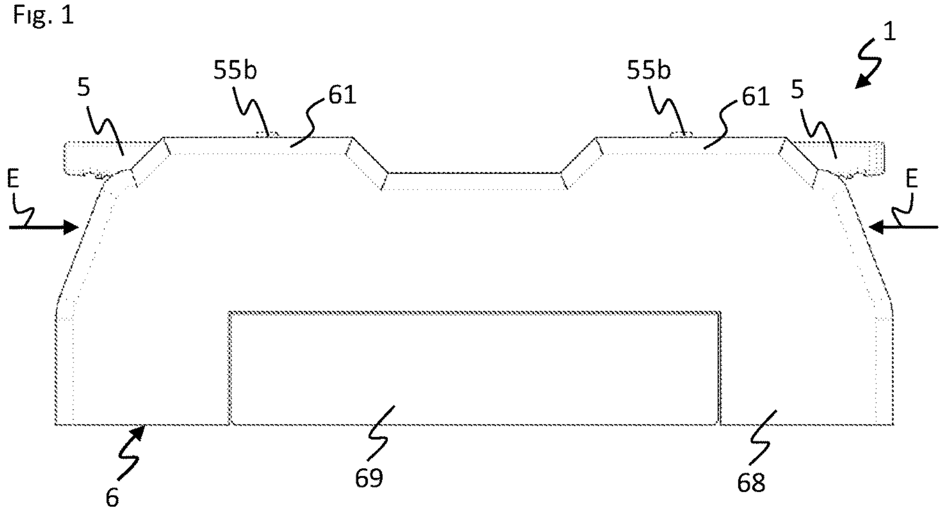
FIG. 1 shows a side view of a terminal according to an exemplary embodiment of the present invention with release levers in the idle position.
Figure 2:
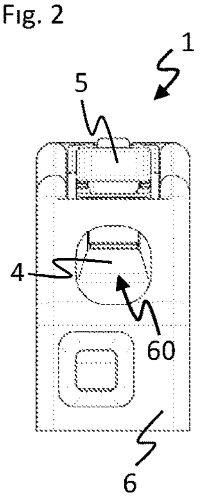
FIG. 2 shows a face-side view as seen in the conductor introduction direction of the terminal according to the invention according to FIG. 1.
Figure 3:
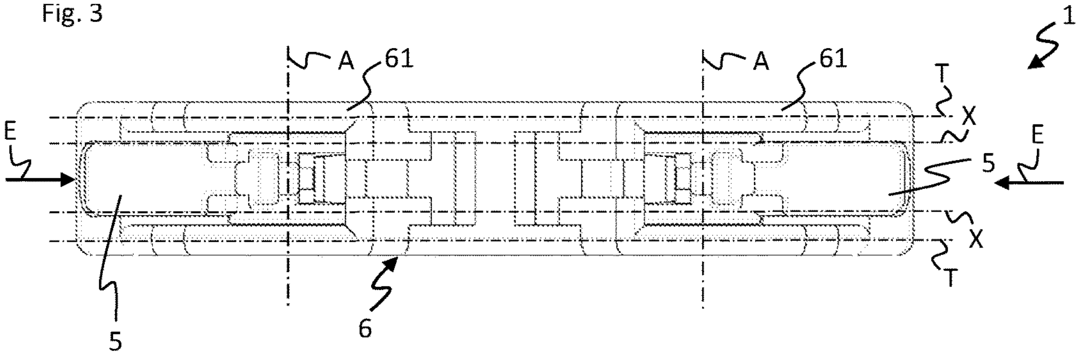
FIG. 3 shows a plan view of the terminal according to the invention according to FIG. 1.
Figure 4:
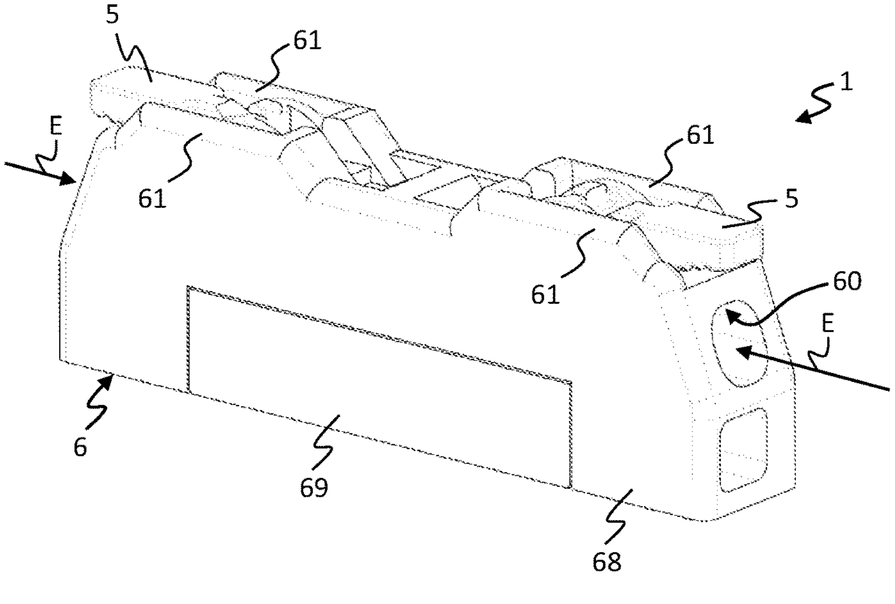
FIG. 4 shows a perspective view of the terminal according to the invention according to FIG. 1.

The figures show different views and details of a terminal 1, in particular of a screw or connecting terminal, according to the present invention.

Terminal 1 has in this case a spring force terminal connection 2 with at least one conductor terminal point K for electrical connection of at least one conductor, as can be inferred in particular from FIGS. 9 to 13 and also FIGS. 5 to 8. Spring force terminal connection 2 preferably has, as represented, a busbar 3 and a clamping spring 4 with a movable clamping leg 42. Clamping leg 42 in turn preferably has a clamping portion 421, here preferably in the form of a clamping edge, for the formation of conductor terminal point K between clamping portion 421 and busbar 3.

As shown in particular in FIGS. 5 to 8 and 10, clamping spring 4 can have two clamping legs 42, 40 which are connected to one another via a spring bow 41. Respective clamping portion 421, 401 can preferably be provided on a free end of clamping spring 4 or respective clamping leg 42, 40 facing away from spring bow 41. Clamping spring 4 can alternatively have, instead of second clamping leg 40, a stop leg which supports clamping spring 4 in the busbar or insulating material housing 6, and from which the spring bow extends, and from which in turn the clamping leg then extends in order to form, for example, a substantially U-shaped clamping spring 4.

Terminal 1 furthermore has an insulating material housing 6 (cf. for example FIGS. 1 to 8) which at least partially accommodates spring force terminal connection 2. Insulating material housing 6 is produced from an electrically non-conductive material, such as plastic. This preferably in an injection molding process. Insulating material housing 6 can preferably be formed in one piece or preferably in several pieces here. In the case of a multi-piece formation, the corresponding parts of insulating material housing 6 can be connected detachably or non-detachably to one another, for example, by means of corresponding latching elements and/or welding.

Terminal 1 furthermore has a conductor introduction channel 60 which extends in a conductor introduction direction E from the outside toward conductor terminal point K. As is also described below, conductor introduction channel 60 can be formed or delimited by different regions and portions of terminal 1.

As can be inferred from the exemplary embodiment, spring force terminal connection 2 can have several conductor terminal points K and thus also several assigned conductor introduction channels. These are preferably arranged at least partially or all in a row next to one another and/or above one another and/or directed toward one another. In the represented exemplary embodiment, as can be inferred from FIGS. 7 and 8, in each case two upper and two lower conductor terminal points K are provided. Upper and lower conductor terminal points K or conductor introduction channels 60 are in each case directed toward one another. Conductor introduction directions E of conductor introduction channels 60 assigned to conductor terminal points K are preferably oriented at least partially or, as represented here, all parallel to one another.

As can be further inferred from FIGS. 1 to 13, terminal 1 furthermore has a release lever 5 which is mounted in insulating material housing 6 pivotably about a pivot axis A extending transverse to conductor introduction direction E. Release lever 5 is in this case mounted in insulating material housing 6 pivotably about pivot axis A between an idle position (cf. FIGS. 1-4, 6 and 7), in which conductor terminal point K for connection of an electrical conductor is closed, and an actuating position (cf. FIGS. 5 and 8-13), in which conductor terminal point K is opened by interaction of spring force terminal connection 2 with an actuating portion 52 of release lever 5. If terminal 1 has several conductor terminal points K, such a release lever 5 can thus be assigned to at least one, several or all conductor terminal points K. In the represented exemplary embodiment, in each case one release lever 5 is assigned here to two of the four conductor terminal points K. Pivot axes A of release levers 5 assigned to the several conductor terminal points K are preferably arranged at least partially parallel or coaxially. In the represented exemplary embodiment, pivot axes A of all (i.e. here both) release levers 5 are arranged parallel to one another.

Figure 5:
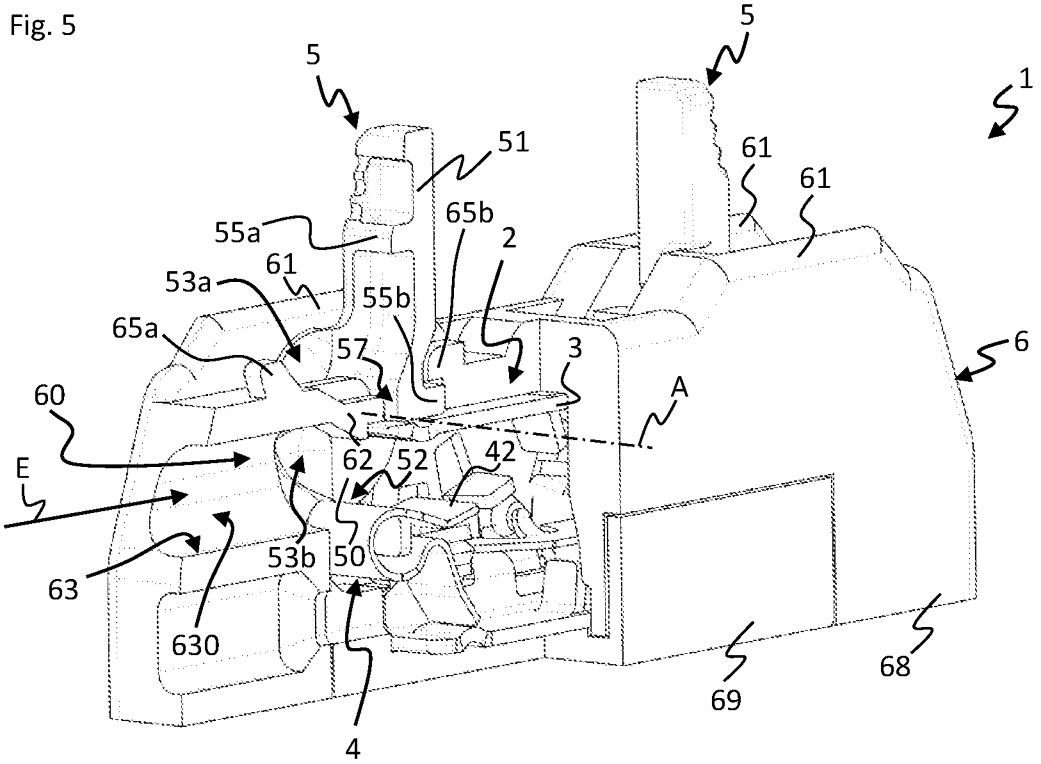
FIG. 5 shows a perspective partial sectional view of the terminal according to the invention according to FIG. 1 with release levers in the actuating position.
Figure 6:
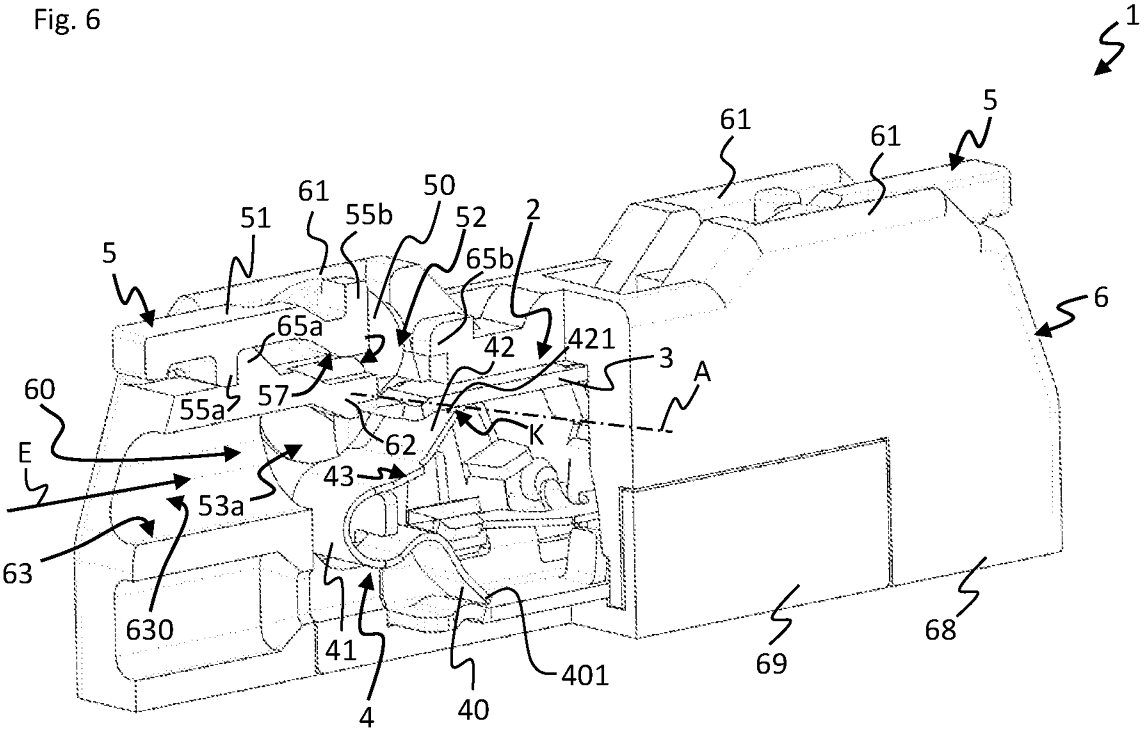
FIG. 6 shows a perspective partial sectional view of the terminal according to the invention according to FIG. 1 with release levers in the idle position.
Figure 7:
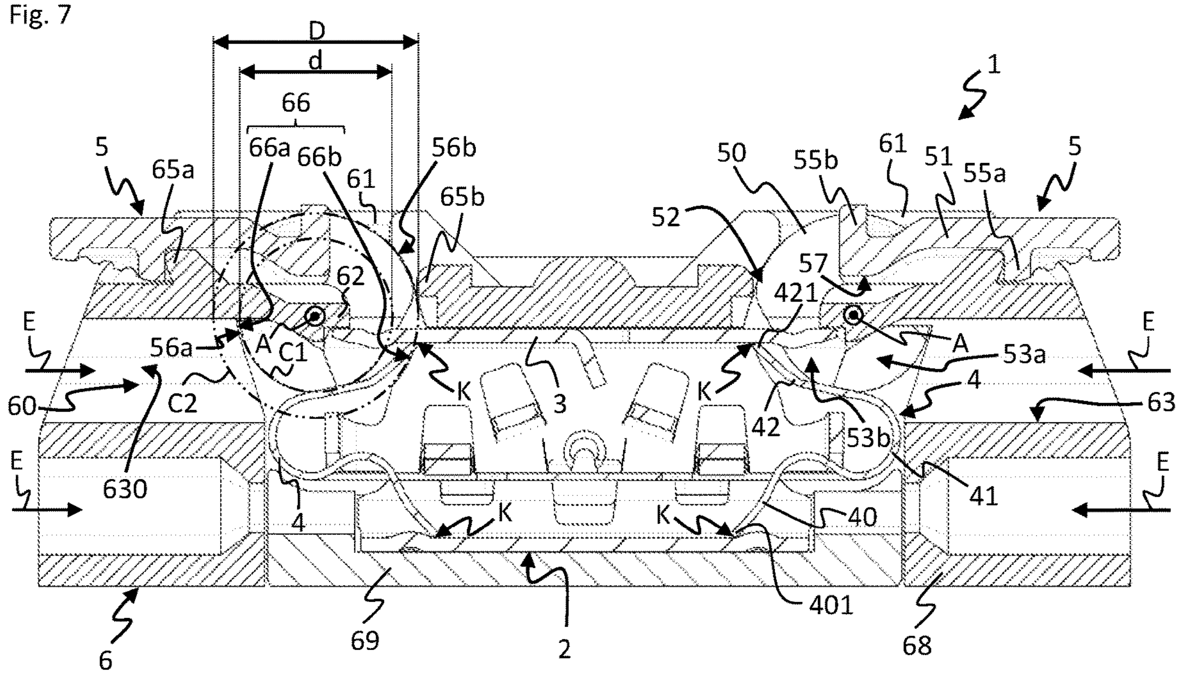
FIG. 7 shows a lateral cross-sectional view of the terminal according to the invention according to FIG. 6.
Figure 8:
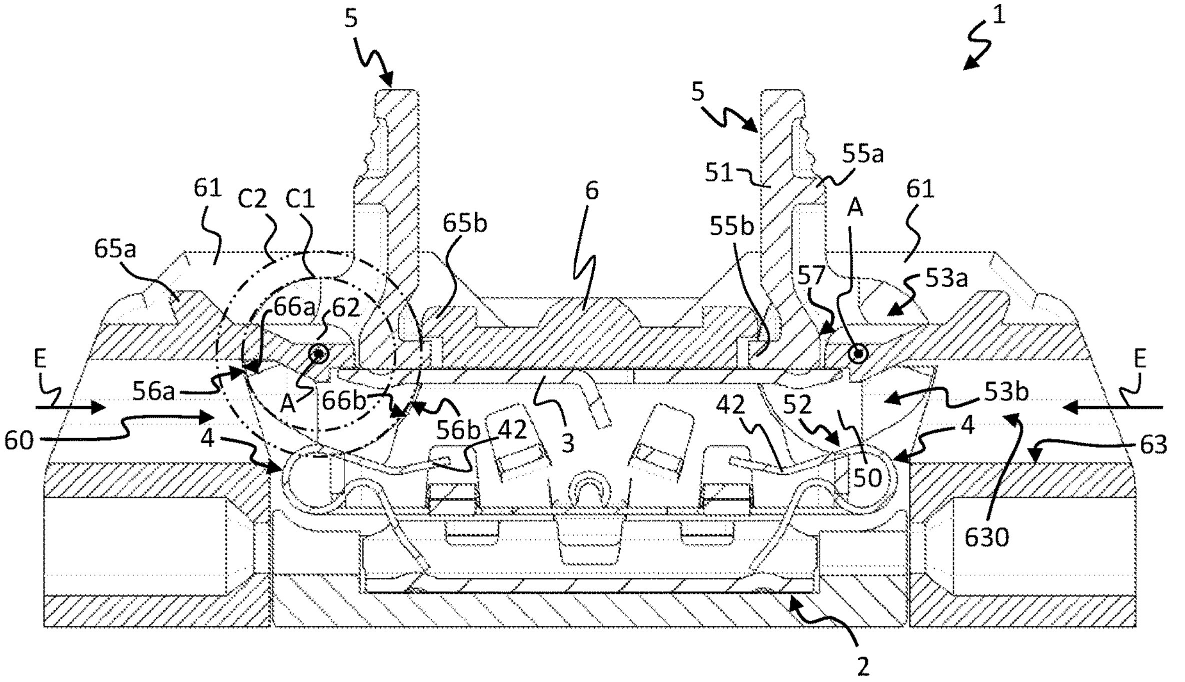
FIG. 8 shows a lateral cross-sectional view of the terminal according to the invention according to FIG. 5.
Figure 10:
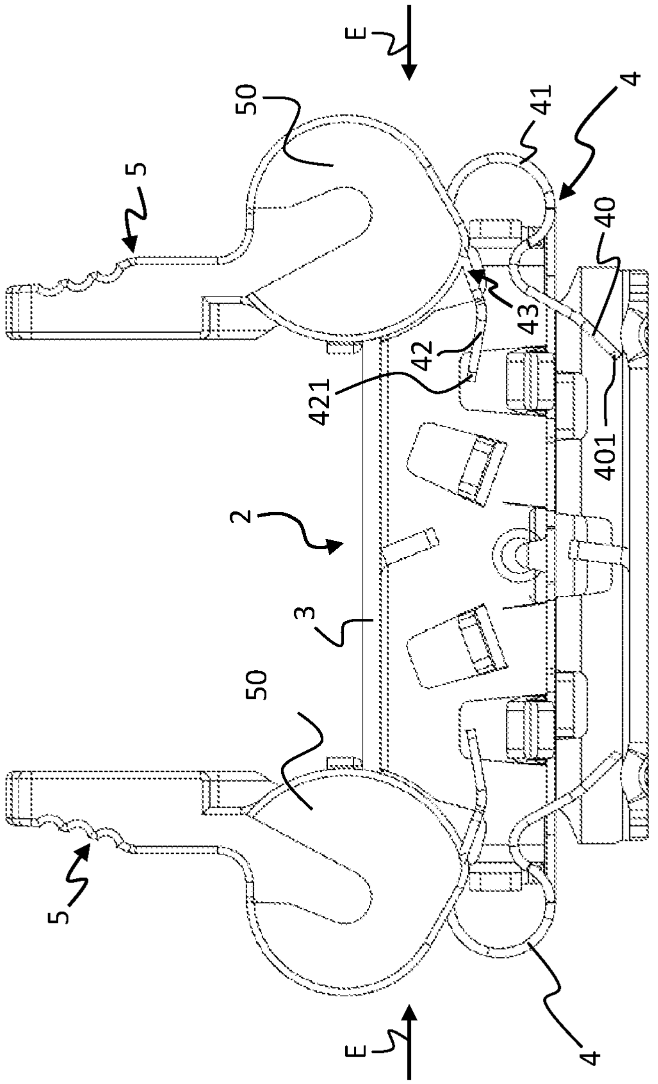
FIG. 10 shows a side view of the components represented in FIG. 11 of the terminal according to the invention according to FIG. 1.
Figure 11:
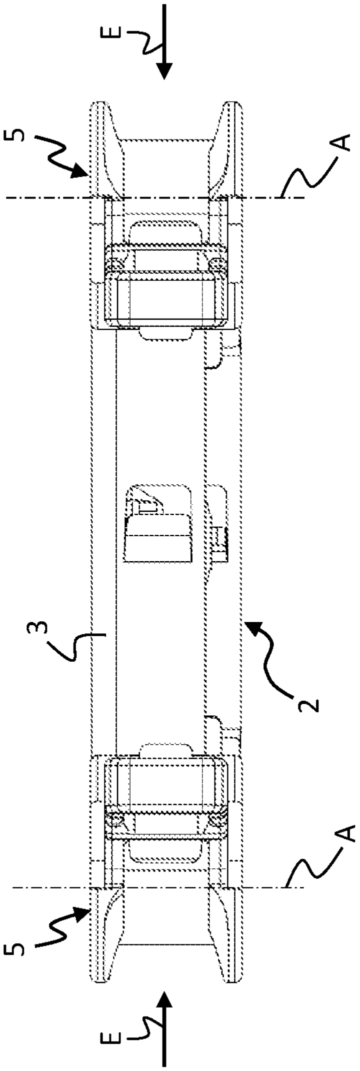
FIG. 11 shows a plan view of the components represented in FIG. 11 of the terminal according to the invention according to FIG. 1.
Figure 9:
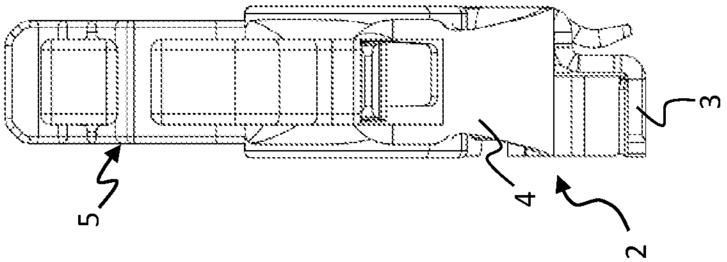
FIG. 9 shows a face-side view as seen in the conductor introduction direction of spring force terminal connection and release levers (in actuating position) of the terminal according to the invention according to FIG. 1.
Figure 12:
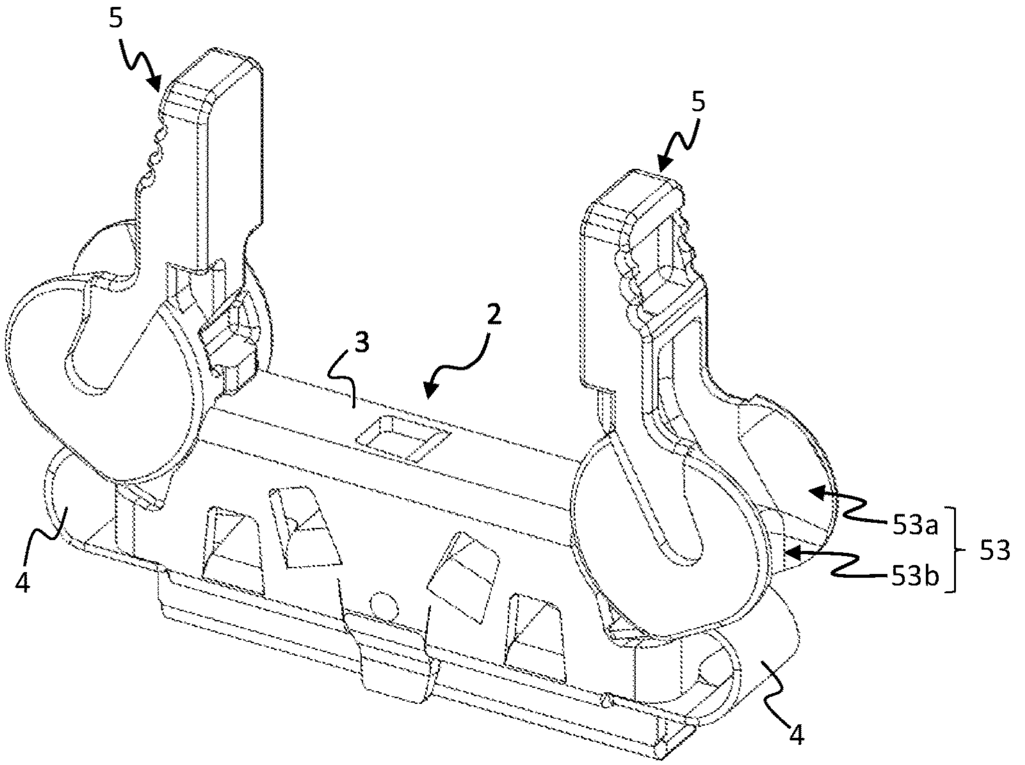
FIG. 12 shows a first perspective view of the components represented in FIG. 11 of the terminal according to the invention according to FIG. 1.
Figure 13:
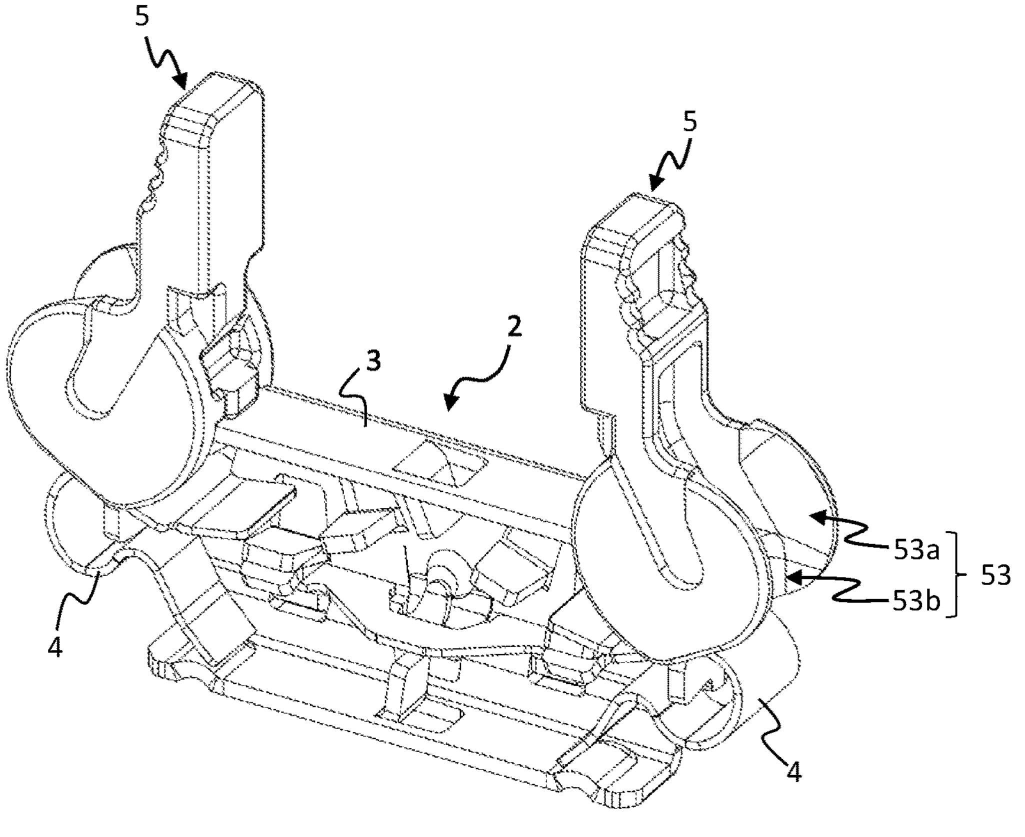
FIG. 13 shows a further perspective view of the components represented in FIG. 11 of the terminal according to the invention according to FIG. 1.

Release lever 5 can preferably have latching structures 55*a*, 55*b* which interact with corresponding housing latching structures 65*a*, 65*b* of insulating material housing 6 in such a manner that release lever 5 is held in a detachably latching manner in the idle position and/or in the actuating position. FIGS. 6 and 7 show this detachably latching connection of (first) latching structure 55*a* and (first) housing latching structure 65*a* in the idle position of release lever 5. Release lever 5 can thus be held securely in the idle position if terminal 1 is transported or installed for operation and is electrically connected. FIGS. 5 and 8 show the detachably latching connection of (second) latching structure 55*b* and (second) housing latching structure 65*b* in the actuating position of release lever 5. Release lever 5 can thus be held securely in the actuating position if it holds open conductor terminal point K for introduction or removal of an electrical conductor, which increases the ease of operation of terminal 1.

Release lever 5 can have a lever actuating portion 51 for movement of release lever 5 about its pivot axis A, preferably between the idle position and the actuating position. Lever actuating portion 51 can preferably extend substantially in a plane. Actuating portion 52 and lever actuating portion 51 are particularly preferably provided at opposite ends of release lever 5, as can be inferred in particular from FIGS. 14 to 17.

As can be inferred in particular from FIGS. 5 to 8, pivot axis A preferably extends laterally outside conductor introduction channel 60 and here above thereof. Pivot axis A consequently does not intersect conductor introduction channel 60 or an elongation of conductor introduction channel 60 as seen in conductor introduction direction E. However, the invention is not fundamentally restricted to this. Pivot axis A can thus also intersect conductor introduction channel 60; preferably centrally.

Release lever 5 has two lever arm portions 50 which are spaced apart from one another and which are immersed here on both sides of conductor introduction channel 60 (i.e. as seen here in conductor introduction direction E) at least partially into insulating material housing 6, as can be inferred in particular from the sectional representations of FIGS. 5 to 8.

As can be inferred in particular from FIGS. 15 to 18, lever arm portions 50 preferably extend in each case substantially in a plane of extent X. Planes of extent X are preferably oriented parallel. These planes of extent X are particularly preferably oriented orthogonally to pivot axis A.

Lever actuating portion 51 can preferably extend between lever arm portions 50 and connect these to one another, as can be inferred by way of example from FIGS. 14 to 18.

Lever arm portions 50 have in each case a guide portion 53 which face one another and form or delimit between them at least a part of conductor introduction channel 60 (cf. for example FIGS. 5 to 8). This preferably applies to each movement position of release lever 5 about pivot axis A.

Guide portions 53 at least in the idle position or at least in the actuating position or—as shown in the represented exemplary embodiment—at least in the idle position and in the actuating position, as seen in conductor introduction direction E, run in a manner toward conductor terminal point K that narrows conductor introduction channel 60. In this case, guide portions 53 run toward one another toward conductor terminal point K so that a distance between guide portions 53 is reduced and consequently in particular the width of conductor introduction channel 60 is reduced; this is thus narrowed toward conductor terminal point K. Guide portions 53 particularly preferably run as seen in conductor introduction direction E toward conductor terminal point K in a manner that continuously narrows conductor introduction channel 60 or running smoothly, as can be inferred by way of example from FIGS. 5, 6 and 18.

In one embodiment, it is conceivable that guide portions 53, in each pivot position of release lever 5 also between the idle position and the actuating position, as seen in conductor introduction direction E, run in a manner toward conductor terminal point K that narrows conductor introduction channel 60. This can be performed either by specific geometric configuring or contouring of guide portions 53. For example, the narrowest region can also be provided in the region of pivot axis A and widen with respect thereto with increasing distance.

It is also conceivable that guide portions 53 have in each case a first guide sub-portion 53*a* and a second guide sub-portion 53*b* which respectively face one another. In the idle position (cf. for example FIGS. 6 and 7), first guide sub-portions 53*a*, as seen in conductor introduction direction E, run toward conductor terminal point K in a manner that narrows, preferably continuously narrows conductor introduction channel 60 or smoothly narrows conductor introduction channel 60. In the actuating position (cf. for example FIGS. 5 and 8), second guide sub-portions 53*b*, as seen in conductor introduction direction E, run toward conductor terminal point K in a manner that narrows, preferably continuously narrows conductor introduction channel 60 or smoothly narrows conductor introduction channel 60. These guide sub-portions 53*a*, 53*b* are also represented in FIG. 18 in addition to FIGS. 5 to 8.

Figure 15:
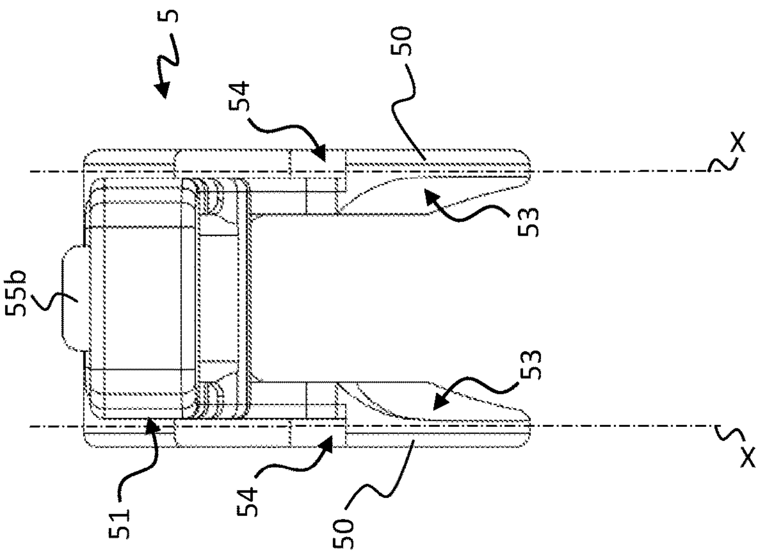
FIG. 15 shows a face-side view of the release lever according to FIG. 14 as seen in the conductor introduction direction.
Figure 14:
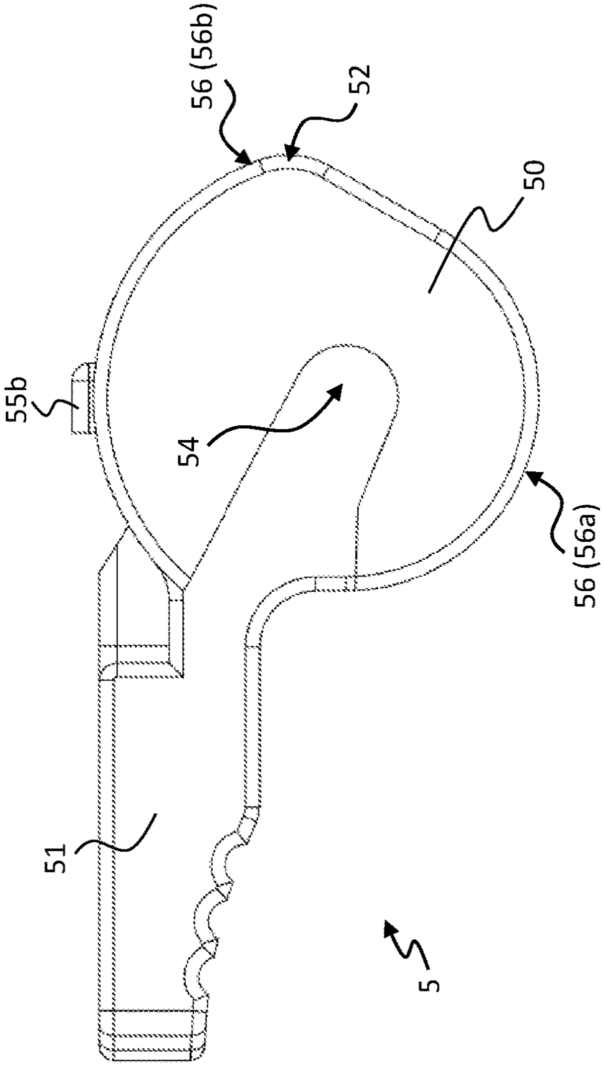
FIG. 14 shows a side view of the release lever of the terminal according to the invention according to FIG. 1.
Figure 16:
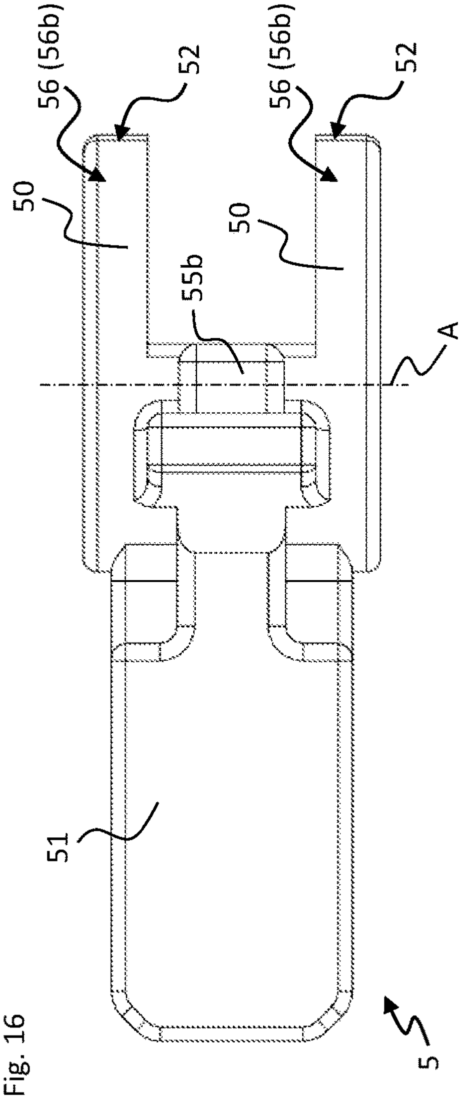
FIG. 16 shows a plan view of the release lever according to FIG. 14, 5
Figure 18:
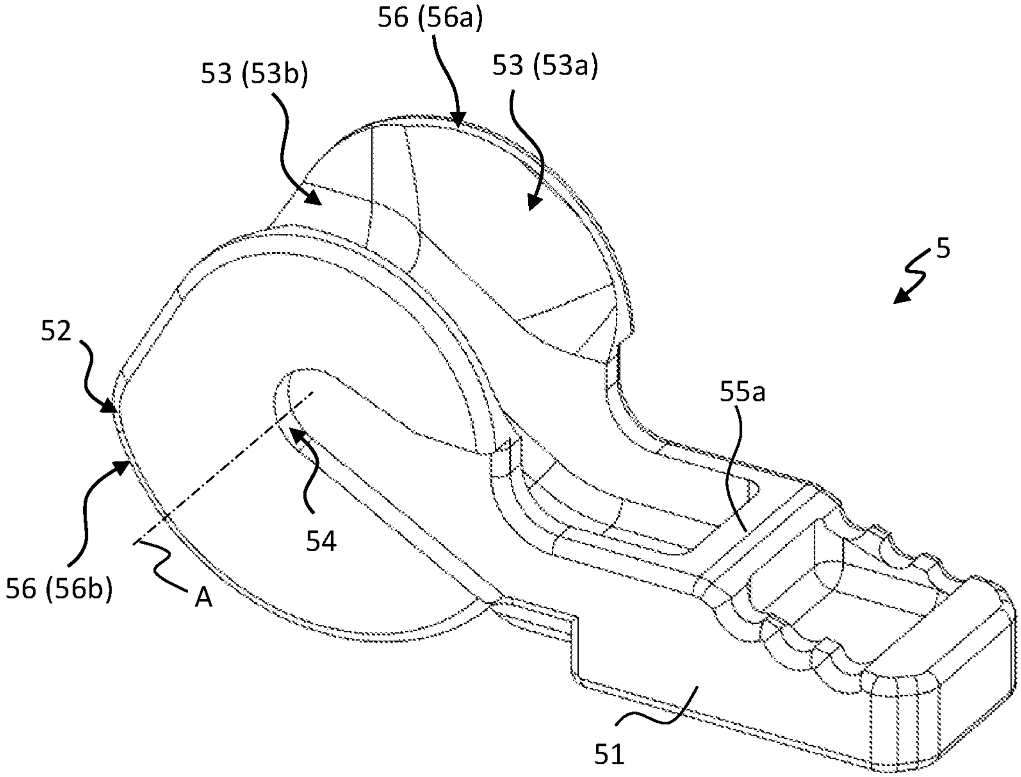
FIG. 18 shows a further perspective view of the release lever according to FIG. 14.

Guide portions 53 and here guide sub-portions 53*a*, 53*b* can be formed in each case arched away concavely from conductor introduction channel 60 or to be bowl-shaped in respective lever arm portion 50, as can be inferred by way of example from a combined view of FIGS. 15 and 18.

In particular with reference to FIG. 15, guide portions 53 or their guide sub-portions 53*a*, 53*b* can be formed by an axial change in material thickness—preferably axially with respect to pivot axis A—of respective lever arm 50.

Insulating material housing 6 can furthermore have guide wall portions 63 which, together with guide portions 53, at least partially form or delimit conductor introduction channel 60. Guide wall portions 63 can have lateral wall portions 630 which at least partially laterally delimit conductor introduction channel 60 with respect to pivot axis A axially on both sides, as can be inferred, for example, from the representations of FIGS. 5 and 6.

Lateral wall portions 630 can preferably at least on the side of conductor introduction channel 60 and at least in the idle position or in the actuating position as seen in conductor introduction E form a transition in a smoothly running manner into respective guide portion 53, wherein these particularly preferably extend into one another on the surface, as can likewise be inferred by way of example from FIGS. 5 and 6.

As can be inferred by way of example from FIGS. 5 to 8, spring force terminal connection 2 can be at least partially covered on the side of insulating material housing 6, on which release lever 5 is arranged here, by an outer (here upper) cover wall 62 of insulating material housing 6. Cover wall 62 extends here preferably in the idle position of release lever 5 between a supporting portion 57 of release lever 5 and pivot axis A above conductor introduction channel 60. Terminal 1 is then formed in such a manner that supporting portion 57 is preferably supported in a sliding manner during pivoting of release lever 5 about pivot axis A on cover wall 62, as is apparent, for example, from the combined view of FIGS. 5 and 6 or FIGS. 7 and 8.

Insulating material housing 6 can furthermore have separating wall portions 61 which delimit release lever 5 in relation to pivot axis A axially on both sides at least partially laterally to the outside. Separating wall portions 61 can at least partially form a lateral outer wall of insulating material housing 6, as can be inferred, for example, from FIG. 3. Separating wall portions 61 in a direction away from conductor introduction channel 60 (here perpendicular to a conductor introduction direction E) at least in the case of closed conductor terminal point K can terminate flush with release lever 5 or at least partially project beyond it and/or be at least partially offset with respect thereto. In the exemplary embodiments represented here, release lever 5 is arranged offset with respect to separating wall portions 61 apart from a part of second latching structure 55*b* in the idle position, as can be inferred, for example, from FIGS. 1 and 7. Separating wall portions 61 can extend in each case at least partially substantially in a separating wall plane T, wherein separating wall planes T preferably extend perpendicular to pivot axis A. As can be inferred in particular from FIGS. 3 to 6, plane of extent X and separating wall plane T can be oriented parallel to one another in each case on one side of conductor introduction channel 60.

Lever arm portions 50 can have in each case partially circular sliding portions 56 which extend around pivot axis A and are directed radially away from pivot axis A, which sliding portions interact with corresponding housing sliding portions 66 for sliding guidance of release lever 5 about pivot axis A, as is shown by way of example in FIGS. 7 and 8.

Likewise with reference to FIGS. 7 and 8, sliding portions 56 can have first sliding sub-portions 56*a* which extend in relation to pivot axis A along a first circle C1 with first diameter d, preferably in the region of respective guide portions 53. Corresponding first housing sliding sub-portions 66*a* of housing sliding portions 66 consequently likewise extend correspondingly along first circle C1. Sliding portions 56 can then have second sliding sub-portions 56*b* which extend in relation to pivot axis A along a second circle C2 with second diameter D which is preferably larger than first diameter d; this preferably in a region outside respective guide portions 53. Corresponding second housing sliding sub-portions 66*b* of housing sliding portions 66 consequently likewise extend correspondingly along second circle C2.

As can be inferred in particular from FIGS. 7 and 8 as well as 14 to 18, in one preferred configuration, second sliding sub-portions 56*b* can preferably have or form respective actuating portions 52 so that the overall structure of release lever 5 is simplified. This is in particular preferably facilitated by a cam-like geometry of lever arm portions 50 as a result of the extension described above along circles C1, C2 with different diameters D, d, which is apparent in particular in FIGS. 5-18.

Figure 19:
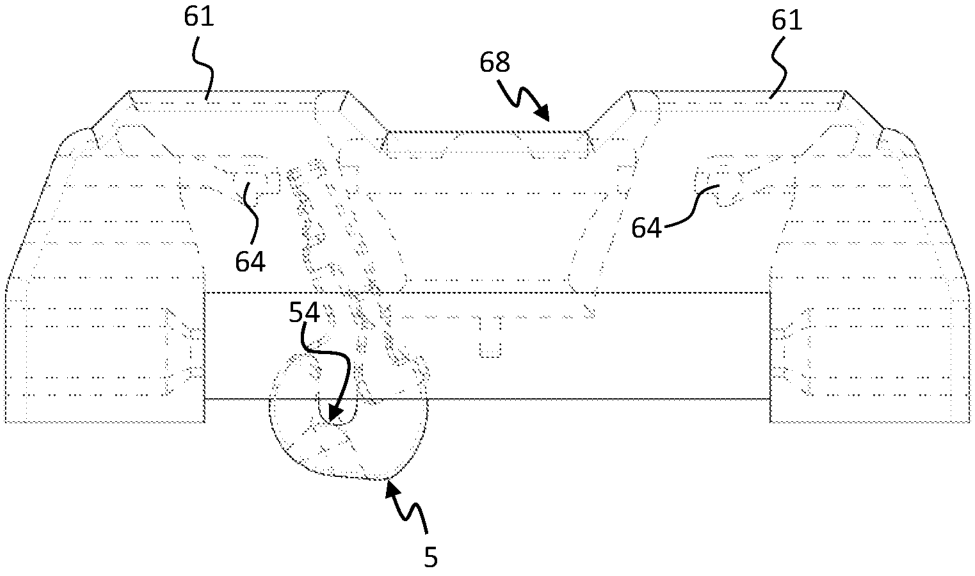
FIG. 19 shows a functional side view of an insulating material housing and a release lever of the terminal according to the invention according to FIG. 1 during insertion of the release lever into the insulating material housing.
Figure 20:
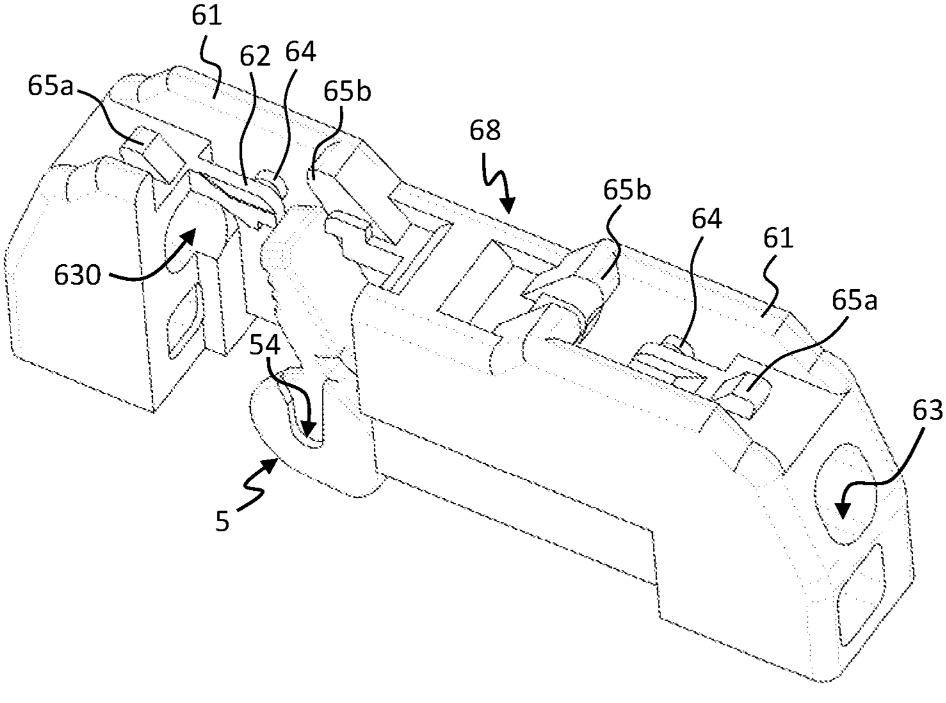
FIG. 20 shows a functional perspective view of the components represented in FIG. 19 of the terminal according to the invention according to FIG. 1.

Release lever 5 and preferably its lever arm portions 50 preferably has/have in each case on a side facing away from conductor introduction channel 60 a first pivot bearing portion 54 which interact in each case with a corresponding second pivot bearing portions 64 of insulating material housing 6, preferably of respective facing separating wall portion 61, for pivotable mounting of release lever 5 about pivot axis A. First pivot bearing portions 54 are formed here as a V-shaped groove on the outer side of respective lever arm portion 50. These then receive second pivot bearing portion 64 here in the form of a pin-like projection in order to pivotably mount release lever 5. Release lever 5 can for this purpose, as can be inferred from FIGS. 19 and 20, be inserted from below with the wide opening of V-shaped groove 54 into insulating material housing 6—here a housing main body 68. V-shaped groove 54 is then pushed via pin-like projection 64, in order to receive it in a pivotably bearing manner in the base of V-shaped groove 54. Spring force terminal connection 2 is subsequently likewise inserted from below into insulating material housing 6 or housing main body 68 and is subsequently closed from below with a housing cover 69 (cf. for example FIGS. 7 and 8).

Figure 17:
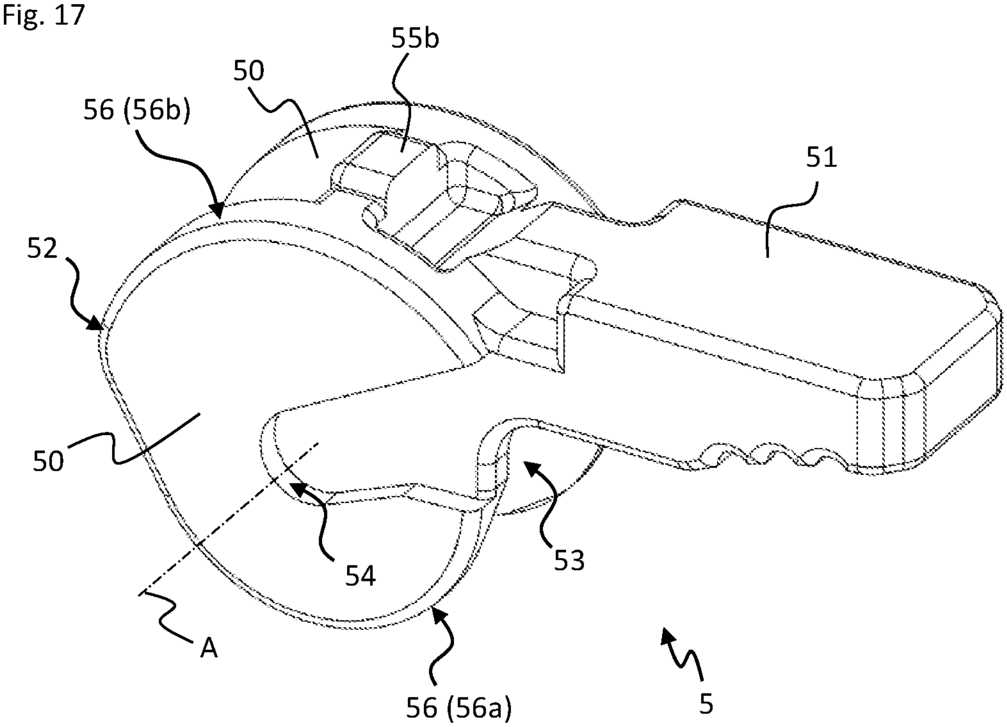
FIG. 17 shows a first perspective view of the release lever according to FIG. 14.

First pivot bearing portions 54 are preferably provided on or in a side (i.e. here the outer side) of lever arm portions 50 facing away from conductor introduction channel 60, as can be inferred by way of example from FIGS. 17 and 18. In this configuration, first pivot bearing portions 54 are thus provided on a side facing away from guide portions 53 (here an inner side facing conductor introduction channel 60). An electrical conductor to be introduced into conductor introduction channel 60, if it is supported in a sliding manner on guide portions 53 for guidance to conductor terminal point K, thus forces lever arm portions 50 in any event further toward second pivot bearing portions 64 so that a bearing connection is reliably maintained via pivot bearing portions 54, 64.

As can be inferred in particular from FIGS. 6 and 7, clamping spring 4 or its clamping leg 42, at least in the closed position of conductor terminal point K, as seen in conductor introduction direction E, can extend transversely through conductor introduction channel 60 in order to form a lead-in chamfer toward conductor terminal point K.

Spring force terminal connection 2, preferably its clamping spring 4, can have a spring actuating portion 43 which is arranged in such a manner that it interacts with actuating portion 52 for optional opening of conductor terminal point K. Spring actuating portion 43 preferably protrudes laterally (i.e. transverse to conductor introduction direction E or to the direction of extent of clamping leg 42) and here in particular on both sides of clamping leg 42, as can be inferred, for example, from FIGS. 5, 6 and 9 to 13. Here, actuating portion 52 is moved along second circle C2 by a pivoting movement of release lever 5 from the idle position into the actuating position. Spring actuating portions 43 which protrude on both sides lie on the movement path of actuating portion 52 and come into operative contact with precisely this as a result of the pivoting movement. As a result of this, clamping spring 4 or its clamping leg 42 is pivoted downward and subsequently conductor terminal point K is opened.

The present invention is not restricted by the preceding exemplary embodiment insofar as it is encompassed by the subject matter of the following claims.

The invention claimed is:

1. Terminal (1) having:

a spring force terminal connection (2) with at least one conductor terminal point (K) for electrical connection of at least one conductor, an insulating material housing (6) which at least partially accommodates the spring force terminal connection (2), a conductor introduction channel (60) which extends in a conductor introduction direction (E) from the outside toward the conductor terminal point (K), and a release lever (5) which is mounted in the insulating material housing (6) pivotably about a pivot axis (A) extending transverse to the conductor introduction direction (E) between an idle position in which the conductor terminal point (K) for connection of an electric conductor is closed, and an actuating position in which the conductor terminal point (K) is opened by interaction of the spring force terminal connection (2) with an actuating portion (52) of the release lever (5), wherein the release lever (5) has two lever arm portions (50) which are spaced apart from one another and which are immersed on both sides of the conductor introduction channel (60) at least partially into the insulating material housing (6), wherein the lever arm portions (50) have in each case a guide portion (53) which face one another and form between them at least a part of the conductor introduction channel (60), wherein the guide portions (53) in the idle position and in the actuating position, as seen in the conductor introduction direction, run toward the conductor terminal point (K) in a manner which narrows the conductor introduction channel (60), wherein each of the guide portions (53) has a first guide sub-portion (53*a*) and a second guide sub-portion (53*b*), wherein the first guide sub-portions (53*a*) face each other and the second guide portions (53*b*) face each other, wherein, in the idle position, the first guide sub-portions (53*a*), as seen in the conductor introduction direction (E), run toward the conductor terminal point (K) in a manner which continuously narrows the conductor introduction channel (60) or smoothly narrows the conductor introduction channel, wherein, in the actuating position, the second guide sub-portions (53*b*), as seen in the conductor introduction direction (E), run toward the conductor terminal point (K) run in a manner which continuously narrows the conductor introduction channel (60) or smoothly narrows the conductor introduction channel, and wherein the guide sub-portions (53*a*, 53*b*) are formed in each case arched away concavely from the conductor introduction channel (60) or to be bowl-shaped in the respective lever arm portion (50).

2. Terminal (1) according to claim 1, wherein the guide sub-portions (53*a*, 53*b*) are formed by an axial change in material thickness, with respect to the pivot axis (A), of the respective lever arm (50).

3. Terminal (1) according to claim 1, wherein the insulating material housing (6) has guide wall portions (63) which, together with the guide portions (53), at least partially form the conductor introduction channel (60).

4. Terminal (1) according to claim 1, wherein the guide wall portions (63) have lateral wall portions (630) which at least partially laterally delimit the conductor introduction channel (60) in relation to the pivot axis (A) axially on both sides, wherein the lateral wall portions (630) form a transition at least on the side of the conductor introduction channel (60) and at least in the idle position and in the actuating position as seen in the conductor introduction direction (E) running smoothly into the respective guide portion (53).

5. Terminal (1) having:

a spring force terminal connection (2) with at least one conductor terminal point (K) for electrical connection of at least one conductor, an insulating material housing (6) which at least partially accommodates the spring force terminal connection (2), a conductor introduction channel (60) which extends in a conductor introduction direction (E) from the outside toward the conductor terminal point (K), and a release lever (5) which is mounted in the insulating material housing (6) pivotably about a pivot axis (A) extending transverse to the conductor introduction direction (E) between an idle position in which the conductor terminal point (K) for connection of an electric conductor is closed, and an actuating position in which the conductor terminal point (K) is opened by interaction of the spring force terminal connection (2) with an actuating portion (52) of the release lever (5), wherein the release lever (5) has two lever arm portions (50) which are spaced apart from one another and which are immersed on both sides of the conductor introduction channel (60) at least partially into the insulating material housing (6), wherein the lever arm portions (50) have in each case a guide portion (53) which face one another and form between them at least a part of the conductor introduction channel (60), wherein the guide portions (53) in the idle position and in the actuating position, as seen in the conductor introduction direction, run toward the conductor terminal point (K) in a manner which narrows the conductor introduction channel (60), wherein the lever arm portions (50) have in each case partially circular sliding portions (56) which extend around the pivot axis (A) and are directed radially away from the pivot axis (A), which sliding portions interact with corresponding housing sliding portions (66) for sliding guidance of the release lever (5) about the pivot axis (A), wherein the sliding portions (56) have first sliding sub-portions (56*a*) which extend in relation to the pivot axis (A) along a first circle (C1) with first diameter d, and wherein the sliding portions (56) have second sliding sub-portions (56*b*) which extend in relation to the pivot axis (A) along a second circle (C2) with second diameter D which is larger than first diameter d, wherein the second sliding sub-portions (56*b*) have or form the respective actuating portions (52).

6. Terminal (1) according to claim 5, wherein the guide portions (53) run as seen in the conductor introduction direction (E) toward the conductor terminal point (K) in a manner which continuously narrows the conductor introduction channel (60) or running smoothly.

7. Terminal (1) according to claim 5, wherein the lever arm portions (50) extend in each case substantially in a plane of extent (X).

8. Terminal (1) according to claim 5, wherein the lever arm portions (50) have first pivot bearing portions (54) which interact in each case with corresponding second pivot bearing portions (64) of the insulating material housing (6) for pivotable mounting of the release lever (5) about the pivot axis (A), wherein the first pivot bearing portions (54) are provided on or in a side of the lever arm portions (50) facing away from the conductor introduction channel (60).

9. Terminal (1) according to claim 5, wherein the release lever (5) has a lever actuating portion (51) for movement of the release element (5) about the pivot axis (A), between the idle position and the actuating position, wherein the lever actuating portion (51) extends between the lever arm portions (50) and connects these to one another.

10. Terminal (1) according to claim 5, wherein the pivot axis (A) extends laterally outside the conductor introduction channel (60), and/or wherein the pivot axis (A) does not intersect the conductor introduction channel (60) or an elongation of the conductor introduction channel (60) as seen in the conductor introduction direction (E).

11. Terminal (1) having:

a spring force terminal connection (2) with at least one conductor terminal point (K) for electrical connection of at least one conductor, an insulating material housing (6) which at least partially accommodates the spring force terminal connection (2), a conductor introduction channel (60) which extends in a conductor introduction direction (E) from the outside toward the conductor terminal point (K), and a release lever (5) which is mounted in the insulating material housing (6) pivotably about a pivot axis (A) extending transverse to the conductor introduction direction (E) between an idle position in which the conductor terminal point (K) for connection of an electric conductor is closed, and an actuating position in which the conductor terminal point (K) is opened by interaction of the spring force terminal connection (2) with an actuating portion (52) of the release lever (5), wherein the release lever (5) has two lever arm portions (50) which are spaced apart from one another and which are immersed on both sides of the conductor introduction channel (60) at least partially into the insulating material housing (6), wherein the lever arm portions (50) have in each case a guide portion (53) which face one another and form between them at least a part of the conductor introduction channel (60), wherein the guide portions (53) in the idle position and in the actuating position, as seen in the conductor introduction direction, run toward the conductor terminal point (K) in a manner which narrows the conductor introduction channel (60), and wherein the release lever (5) has latching structures (55*a*, 55*b*) which interact with corresponding housing latching structures (65*a*, 65*b*) of the insulating material housing (6) in such a manner that the release lever (5) is held in a detachably latching manner in the idle position and/or in the actuating position.

12. Terminal (1) according to claim 11, wherein the insulating material housing (6) has separating wall portions (61) which delimit the release lever (5) in relation to the pivot axis (A) axially on both sides at least partially laterally to the outside.

13. Terminal (1) having:

a spring force terminal connection (2) with at least one conductor terminal point (K) for electrical connection of at least one conductor, an insulating material housing (6) which at least partially accommodates the spring force terminal connection (2), a conductor introduction channel (60) which extends in a conductor introduction direction (E) from the outside toward the conductor terminal point (K), and a release lever (5) which is mounted in the insulating material housing (6) pivotably about a pivot axis (A) extending transverse to the conductor introduction direction (E) between an idle position in which the conductor terminal point (K) for connection of an electric conductor is closed, and an actuating position in which the conductor terminal point (K) is opened by interaction of the spring force terminal connection (2) with an actuating portion (52) of the release lever (5), wherein the release lever (5) has two lever arm portions (50) which are spaced apart from one another and which are immersed on both sides of the conductor introduction channel (60) at least partially into the insulating material housing (6), wherein the lever arm portions (50) have in each case a guide portion (53) which face one another and form between them at least a part of the conductor introduction channel (60), wherein the guide portions (53) in the idle position and in the actuating position, as seen in the conductor introduction direction, run toward the conductor terminal point (K) in a manner which narrows the conductor introduction channel (60), and wherein the insulating material housing (6) has a cover wall (62) which extends in the idle position of the release lever (5) between a supporting portion (57) of the release lever (5) and the pivot axis (A) above the conductor introduction channel (E), wherein the terminal (1) is formed in such a manner that the supporting portion (57) is supported during pivoting of the release lever (5) about the pivot axis (A) on the cover wall (62).

14. Terminal (1) according to claim 13, wherein the spring force terminal connection (2) has a busbar (3) and a clamping spring (4) with a movable clamping leg (42), wherein the clamping leg (42) has a clamping portion (421).

15. Terminal (1) according to claim 13, wherein the clamping leg (42), at least in the closed position of the conductor terminal point (K), as seen in the conductor introduction direction (E), extends transversely through the conductor introduction channel (60) in order to form a lead-in chamfer toward the conductor terminal point (K).

16. Terminal (1) according to claim 13, wherein the spring force terminal connection (2), in particular its clamping spring (4), has a spring actuating portion (43) which is arranged in such a manner that it interacts with the actuating portion (52) for selectively opening of the conductor terminal point (K).

17. Terminal (1) according to claim 13, wherein the spring force terminal connection (2) has several conductor terminal points (K) and conductor introduction channels (60) assigned to these, wherein the conductor introduction directions (E) of the conductor introduction channels (60) assigned to the conductor terminal points (K) are oriented at least partially parallel to one another.

18. Terminal (1) according to claim 13, wherein in each case a release lever (5) is assigned to at least two of the several conductor terminal points (K), wherein the pivot axes (A) of the release levers (5) assigned to the several conductor terminal points (K) are arranged at least partially parallel or coaxially.

* * * * *